(12) United States Patent
Ballantine et al.

(10) Patent No.: US 9,972,852 B2
(45) Date of Patent: May 15, 2018

(54) FUEL CELL SYSTEM WITH VARIABLE FREQUENCY DRIVE FOR SUPPORT EQUIPMENT

(71) Applicant: Bloom Energy Corporation, Sunnyvale, CA (US)

(72) Inventors: Arne Ballantine, Palo Alto, CA (US); Ranganathan Gurunathan, Bangalore (IN); Chad Pearson, Mountain View, CA (US); Rajesh Gopinath, Sunnyvale, CA (US); Carl Cottuli, Franklin, MA (US); James Daniel Smith, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 575 days.

(21) Appl. No.: 13/937,312

(22) Filed: Jul. 9, 2013

(65) Prior Publication Data

US 2014/0009003 A1   Jan. 9, 2014

Related U.S. Application Data

(60) Provisional application No. 61/669,494, filed on Jul. 9, 2012.

(51) Int. Cl.
| | |
|---|---|
| G01R 1/20 | (2006.01) |
| H01M 8/04 | (2016.01) |
| H02J 1/00 | (2006.01) |
| G06F 1/28 | (2006.01) |
| H01M 8/04089 | (2016.01) |
| H02J 1/10 | (2006.01) |
| H02J 7/35 | (2006.01) |
| H01M 8/04223 | (2016.01) |

(52) U.S. Cl.
CPC ............... *H01M 8/04* (2013.01); *G06F 1/28* (2013.01); *H01M 8/04089* (2013.01); *H02J 1/00* (2013.01); *H02J 1/102* (2013.01); *H01M 8/04097* (2013.01); *H01M 8/04223* (2013.01); *H01M 2250/10* (2013.01); *H02J 7/35* (2013.01); *Y02B 90/14* (2013.01); *Y02P 80/11* (2015.11)

(58) Field of Classification Search
CPC ...... G06F 1/28; G06F 1/14; G06F 1/10; H02J 1/00; H02J 3/00
USPC .......... 307/11, 64, 66, 65, 77; 700/287, 285, 700/288, 286; 320/101, 108, 137
See application file for complete search history.

(56) References Cited

U.S. PATENT DOCUMENTS

| | | | |
|---|---|---|---|
| 9,071,078 B2 * | 6/2015 | Rockenfeller | H02J 9/062 |
| 2008/0067869 A1 * | 3/2008 | Evans | H02J 3/387 |
| | | | 307/11 |
| 2012/0191252 A1 * | 7/2012 | Rockenfeller | F25B 27/005 |
| | | | 700/276 |
| 2013/0041516 A1 * | 2/2013 | Rockenfeller | H02J 3/38 |
| | | | 700/287 |

* cited by examiner

*Primary Examiner* — Fritz M Fleming
*Assistant Examiner* — Jagdeep Dhillon
(74) *Attorney, Agent, or Firm* — The Marbury Law Group PLLC

(57) ABSTRACT

Various embodiments enable the operation of fuel cell system support equipment using variable frequency drives and power from fuel cells and/or grid power sources.

28 Claims, 11 Drawing Sheets

FUEL CELL SYSTEM WITH VARIABLE FREQUENCY DRIVE FOR SUPPORT EQUIPMENT

CROSS-REFERENCE TO RELATED APPLICATION

This application claims the benefit of priority to U.S. Provisional Patent Application Ser. No. 61/669,494 entitled "Fuel Cell Power for Site Specific Applications" filed Jul. 9, 2012, which is incorporated herein by reference in its entirety.

BACKGROUND

Information technology ("IT") loads are often deployed in racks or cabinets that in most markets average nowadays 4-6 KW per rack. Technology is getting denser with racks going over 40 KW per rack and even higher for High Performance Computing applications. Applications in the range of 8-35 KW are becoming more and more popular with blades, heavy storage, and networking being integrated for mobility reasons.

Cloud computing is allowing utilization of more distributed configurations with better utilization of existing data centers, public clouds, and new private clouds created in a way that is allowing optimal operation for enterprises or the small and medium business (SMB) market, for example, by allowing "Everything as a Service" way of utilization for the cloud consumer. "Infrastructure as a Service" models are better synchronized to the requirements of businesses, therefore, there is a need in the market for building blocks for such infrastructure that will allow overall faster time to market at optimal cost.

Referring to FIG. 1, a prior art fuel cell system includes a DC load 102, such as an information technology (IT) load (i.e., devices operating in an IT system which may include one or more of computer(s), server(s), modem(s), router(s), rack(s), power supply connections, and other components found in a data center environment), an input/output module (IOM) 104, and one or more power modules 106.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc., may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to one or more the DC buses 112 such as a split DC bus, by one or more DC/DC converters 106B located in module 106. The DC/DC converters 106B may be located anywhere in the fuel cell system, for example in the IOM 104 instead of the power modules 106.

The system may also optionally include an energy storage module 108 including a storage device, such as a bank of supercapacitors, batteries, flywheel, etc. The storage device may also be connected to the DC bus 112 using one or more DC/DC converters as shown in FIG. 1. Alternatively, the storage devices may be located in the power module 106 and/or together with the IT load 102.

FIGS. 2 and 5 illustrate an exemplary prior art modular fuel cell system described U.S. Provisional Patent Application Ser. No. 61/386,257, filed Sep. 24, 2010, and entitled "Fuel Cell Mechanical Components", and U.S. Non-Provisional patent application Ser. No. 13/242,194, filed Sep. 23, 2011, entitled "Fuel Cell Mechanical Components", both of which are incorporated herein by reference in their entirety.

The modular system may contain modules and components described above as well as in U.S. patent application Ser. No. 11/656,006, filed on Jan. 22, 2007, and entitled "Modular Fuel Cell System" which is incorporated herein by reference in its entirety. The modular design of the fuel cell system enclosure 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The modular fuel cell system enclosure 10 includes a plurality of power module housings 12 (containing a fuel cell power module components 70, where the housing 12 and its components 70 are jointly labeled 106 in FIG. 1), one or more fuel input (i.e., fuel processing) module housings 16, and one or more power conditioning (i.e., electrical output) module housings 18 (where the housing and its contents are labeled 104 and referred to as "IOM" in FIG. 1). For example, the system enclosure may include any desired number of modules, such as 2-30 power modules, for example 6-12 power modules. FIG. 2 illustrates a system enclosure 10 containing six power modules (one row of six modules stacked side to side), one fuel processing module, and one power conditioning module, on a common base 20. Each module may comprise its own cabinet or housing. Alternatively, as will be described in more detail below, the power conditioning (i.e., IOM) and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in one exemplary embodiment in FIG. 2, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in one embodiment, the input/output module 14 is at the end of the row of power modules 12, it could also be located in the center of a row power modules 12.

The modular fuel cell system enclosure 10 may be configured in a way to ease servicing of the system. All of the routinely or high serviced components (such as the consumable components) may be placed in a single module to reduce amount of time required for the service person. For example, the purge gas and desulfurizer material for a natural gas fueled system may be placed in a single module (e.g., a fuel processing module 16 or a combined input/output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the enclosure 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell enclosure 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel cell enclosure 10 and/or serviced or repaired without stopping an operation of the other modules in the system, allowing the fuel cell system to continue to generate electricity. The entire fuel cell system does not have to be shut down if one stack of fuel cells in one hot box 13 malfunctions or is taken off line for servicing.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door to module 14 may be on the side rather than on the front of the cabinet.

The door 30 may open in tandem with a substantially vertical and then substantially horizontal swing (e.g., "gull-wing" style). In other words, the door 30 opens by being moved up and then at least partially over the top of the enclosure 10 in a substantially horizontal direction. The terms substantially vertical and substantially horizontal of this embodiment include a deviation of 0 to 30 degrees, such as 0 to 10 degrees from exact vertical and horizontal directions, respectively.

The door 30 is mounted on to walls of the enclosure or cabinet 10 of the module 12 or 14 with plural independent mechanical arms. In the open position the upper portion of the door 30 may be located over the enclosure or cabinet 10 and the lower portion of the door may optionally overhang the opening to the enclosure 10. In this configuration, the door 30 provides rain and snow protection for a user when open since the lower portion of the door overhangs from the fuel cell system enclosure 10. Alternatively, the entire door 30 may be located over the enclosure 10 in the open position.

FIG. 3 is a schematic process flow diagram representation of module 12 and the hot box 31 components showing the various flows through the components. In the configuration illustrated in FIG. 3, there may be no fuel and air inputs to the ATO 310. External natural gas or another external fuel may not be fed to the ATO 310. Instead, the hot fuel (anode) exhaust stream from the fuel cell stack(s) 39 is partially recycled into the ATO as the ATO fuel inlet stream. Likewise, there is no outside air input into the ATO. Instead, the hot air (cathode) exhaust stream from the fuel cell stack(s) 39 is provided into the ATO as the ATO air inlet stream.

Furthermore, the fuel exhaust stream is split in a splitter 3107 located in the hot box 1. The splitter 3107 is located between the fuel exhaust outlet of the fuel exhaust recuperator (e.g., fuel heat exchanger) 3137 and the fuel exhaust inlet of the anode cooler 3100 (e.g., the air pre-heater heat exchanger). Thus, the fuel exhaust stream is split between the mixer 3105 and the ATO 310 prior to entering the anode cooler 3100. This allows higher temperature fuel exhaust stream to be provided into the ATO than in the prior art because the fuel exhaust stream has not yet exchanged heat with the air inlet stream in the anode cooler 3100. For example, the fuel exhaust stream provided into the ATO 310 from the splitter 3107 may have a temperature of above 350 C, such as 350-500 C, for example 375 to 425 C, such as 390-410 C. Furthermore, since a smaller amount of fuel exhaust is provided into the anode cooler 3100 (e.g., not 100% of the anode exhaust is provided into the anode cooler due to the splitting of the anode exhaust in splitter 3107), the heat exchange area of the anode cooler 3100 may be reduced.

The splitting of the anode exhaust in the hot box prior to the anode cooler has the following benefits: reduced cost due to the smaller heat exchange area for the anode exhaust cooler, increased efficiency due to reduced anode recycle blower 3123 power, and reduced mechanical complexity in the hot box due to fewer fluid passes.

The benefits of eliminating the external ATO air include reduced cost since a separate ATO fuel blower is not required, increased efficiency because no extra fuel consumption during steady state or ramp to steady state is required, simplified fuel entry on top of the hot box next to anode gas recycle components, and reduced harmful emissions from the system because methane is relatively difficult to oxidize in the ATO. If external methane/natural gas is not added to the ATO, then it cannot slip.

The benefits of eliminating the external ATO fuel include reduced cost because a separate ATO air blower is not required and less ATO catalyst/catalyst support is required due to higher average temperature of the anode and cathode exhaust streams compared to fresh external fuel and air streams, a reduced cathode side pressure drop due to lower cathode exhaust flows, increased efficiency due to elimination of the power required to drive the ATO air blower and reduced main air blower 3125 power due to lower cathode side pressure drop, reduced harmful emissions since the ATO operates with much more excess air, and potentially more stable ATO operation because the ATO is always hot enough for fuel oxidation after start-up.

The hot box 31 contains the plurality of the fuel cell stacks 39, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 39 may be arranged over each other in a plurality of columns or segments.

The hot box 31 also contains a steam generator 3103. The steam generator 3103 is provided with water through conduit 330A from a water source 3104, such as a water tank or a water pipe (i.e., a continuous water supply), and converts the water to steam. The steam is provided from generator 3103 to mixer 3105 through conduit 330B and is mixed with the stack anode (fuel) recycle stream in the mixer 3105. The mixer 3105 may be located inside or outside the hot box of the hot box 31. Preferably, the humidified anode exhaust stream is combined with the fuel inlet stream in the fuel inlet line or conduit 329 downstream of the mixer 3105, as schematically shown in FIG. 3. Alternatively, if desired, the fuel inlet stream may also be provided directly into the mixer 3105, or the steam may be provided directly into the fuel inlet stream and/or the anode exhaust stream may be provided directly into the fuel inlet stream followed by humidification of the combined fuel streams.

The steam generator 3103 is heated by the hot ATO 310 exhaust stream which is passed in heat exchange relationship in conduit 3119 with the steam generator 3103.

The system operates as follows. The fuel inlet stream, such as a hydrocarbon stream, for example natural gas, is provided into the fuel inlet conduit 329 and through a catalytic partial pressure oxidation (CPOx) reactor 3111 located outside the hot box. During system start up, air is also provided into the CPOx reactor 3111 through CPOx air inlet conduit 3113 to catalytically partially oxidize the fuel inlet stream. The air may be blown through the air inlet conduit 3113 to the CPOx reactor 3111 by a CPOx air blower 3114. The CPOx air blower 3114 may only operate during startup. During steady state system operation, the air flow is turned off (e.g., by powering off the CPOx air blower 3114) and the CPOx reactor acts as a fuel passage way in which the fuel is not partially oxidized. Thus, the hot box 31 may comprise only one fuel inlet conduit which provides fuel in both start-up and steady state modes through the CPOx reactor 3111. Therefore a separate fuel inlet conduit which bypasses the CPOx reactor during steady state operation is not required.

The fuel inlet stream is provided into the fuel heat exchanger (anode recuperator)/pre-reformer 3137 where its temperature is raised by heat exchange with the stack 39 anode (fuel) exhaust streams. The fuel inlet stream is pre-reformed in the pre-reformer section of the heat exchanger 3137 via the SMR reaction and the reformed fuel inlet stream (which includes hydrogen, carbon monoxide, water vapor and unreformed methane) is provided into the stacks 39 through the fuel inlet conduit(s) 321. The fuel inlet stream travels upwards through the stacks through fuel inlet risers in the stacks 39 and is oxidized in the stacks 39 during electricity generation. The oxidized fuel (i.e., the anode or fuel exhaust stream) travels down the stacks 39 through the fuel exhaust risers and is then exhausted from the stacks through the fuel exhaust conduits 323A into the fuel heat exchanger 3137.

In the fuel heat exchanger 3137, the anode exhaust stream heats the fuel inlet stream via heat exchange. The anode exhaust stream is then provided via the fuel exhaust conduit 323B into a splitter 3107. A first portion of the anode exhaust stream is provided from the splitter 3107 the ATO 310 via conduit (e.g., slits) 3133.

A second portion of the anode exhaust stream is recycled from the splitter 3107 into the anode cooler 3100 and then into the fuel inlet stream. For example, the second portion of the anode exhaust stream is recycled through conduit 331 into the anode cooler (i.e., air pre-heater heat exchanger) where the anode exhaust stream pre-heats the air inlet stream from conduit 333. The anode exhaust stream is then provided by the anode recycle blower 3123 into the mixer 3105. The anode exhaust stream is humidified in the mixer 3105 by mixing with the steam provided from the steam generator 3103. The humidified anode exhaust stream is then provided from the mixer 3105 via humidified anode exhaust stream conduit 3121 into the fuel inlet conduit 329 where it mixes with the fuel inlet stream.

The air inlet stream is provided by a main air blower 3125 from the air inlet conduit 333 into the anode cooler heat exchanger 3100. The blower 3125 may comprise the single air flow controller for the entire system, as described above. In the anode cooler heat exchanger 3100, the air inlet stream is heated by the anode exhaust stream via heat exchange. The heated air inlet stream is then provided into the air heat exchanger (cathode recuperator 3200) via conduit 3314. The heated air inlet stream is provided from heat exchanger 3200 into the stack(s) 39 via the air inlet conduit and/or manifold 325.

The air passes through the stacks 39 into the cathode exhaust conduit 324 and through conduit 324 and mixer 3801 into the ATO 310. In the ATO 310, the air exhaust stream oxidizes the split first portion of the anode exhaust stream from conduit 3133 to generate an ATO exhaust stream. The ATO exhaust stream is exhausted through the ATO exhaust conduit 327 into the air heat exchanger 3200. The ATO exhaust stream heats air inlet stream in the air heat exchanger 3200 via heat exchange. The ATO exhaust stream (which is still above room temperature) is then provided from the air heat exchanger 3200 to the steam generator 3103 via conduit 3119. The heat from the ATO exhaust stream is used to convert the water into steam via heat exchange in the steam generator 3103. The ATO exhaust stream is then removed from the system via the exhaust conduit 335. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 333 by blower 3125 can be used to control the temperature of the stacks 39 and the ATO 310.

Thus, as described above, by varying the main air flow in conduit 333 using a variable speed blower 3125 and/or a control valve to maintain the stack 39 temperature and/or ATO 310 temperature. In this case, the main air flow rate control via blower 3125 or valve acts as a main system temperature controller. Furthermore, the ATO 310 temperature may be controlled by varying the fuel utilization (e.g., ratio of current generated by the stack(s) 39 to fuel inlet flow provided to the stack(s) 39). Finally the anode recycle flow in conduits 331 and 3117 may be controlled by a variable speed anode recycle blower 3123 and/or a control valve to control the split between the anode exhaust to the ATO 310 and anode exhaust for anode recycle into the mixer 3105 and the fuel inlet conduit 329.

As shown in FIG. 4, field replaceable power module components (PMC) 70 include the hot box sub-system 13, such as the cylindrical hot box 13 that is shown in FIG. 2. The hot box 13 contains the fuel cell stacks and heat exchanger assembly. The PMC 70 also includes a frame 71 supporting the balance of plant (BOP) sub-system including blowers, valves, and control boards, etc (not shown for clarity) and a removable support 72, such as fork-lift rails, which supports the hot box and the frame. The support 72 allows the PMC 70 to be removed from the power module 12 cabinet as a single unit or assembly. Other configurations may also be used. For example, the hot box 13 may have a shape other than cylindrical, such as polygonal, etc. The support 72 may comprise a platform rather than rails. The frame may have a different configuration or it may be omitted entirely with the BOP components mounted onto the hotbox 13 and/or the support 72 instead. The PMC 70 is dimensionally smaller than the opening in the power module 12 (e.g., the opening closed by the door 30). Additionally, the PMC 70 may include one or more vents 81 for exhausting/ventilating gas, such as air, from within the PMC and module 12 to the outside environment. The PMC 70 may also include one or more ventilation fans or blowers 80, such as a ventilation fan driven by an alternating current motor that may force gas, such as air and/or ATO exhaust, out of the PMC 70, such as out of the one or more vents 81.

SUMMARY

The systems, methods, and devices of the various embodiments enable the operation of fuel cell system support equipment using variable frequency drives and power from fuel cells and/or grid power sources.

DETAILED DESCRIPTION

Figure 1:
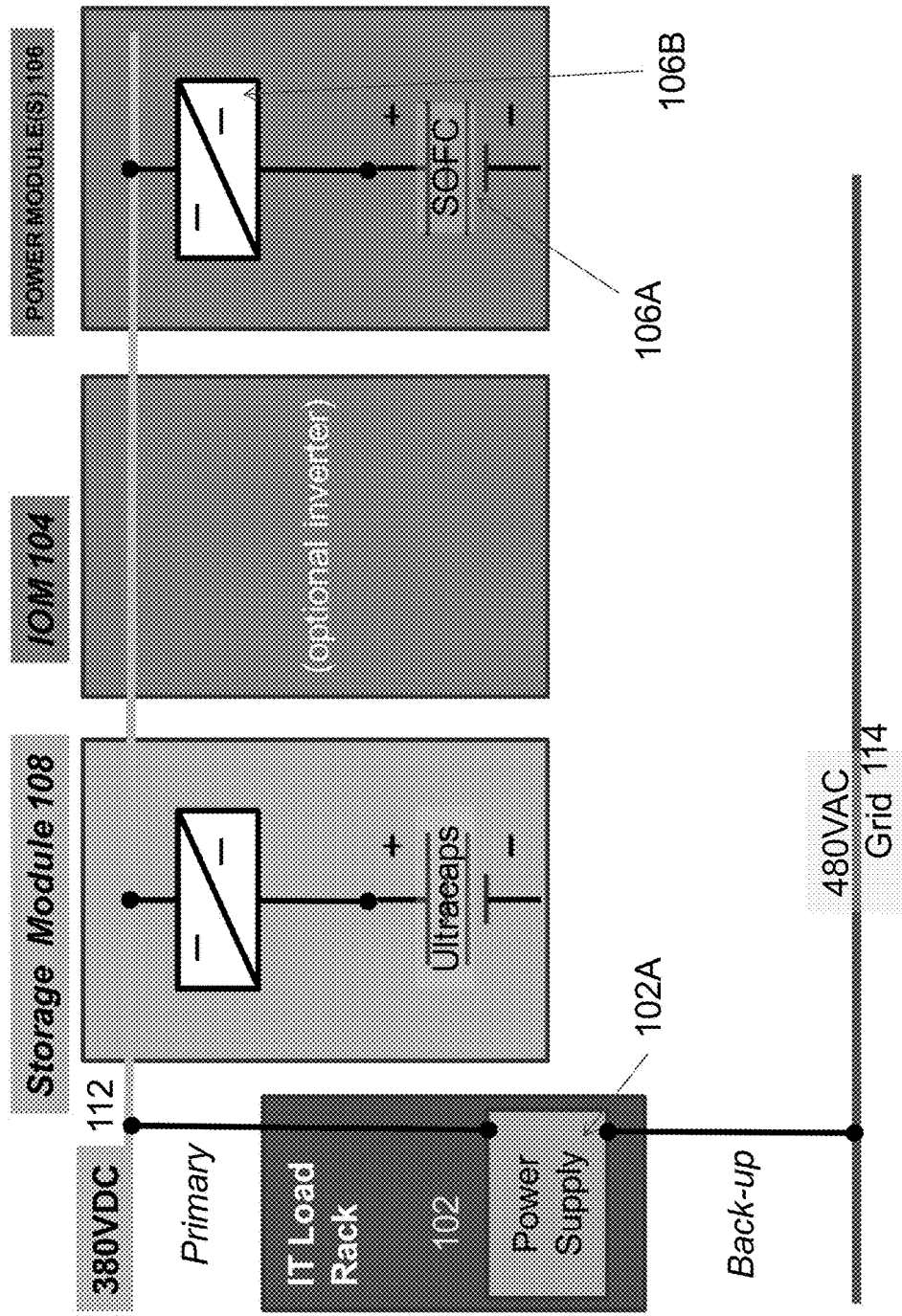
FIG. 1 is a block diagram illustrating a prior art system.
Figure 2:
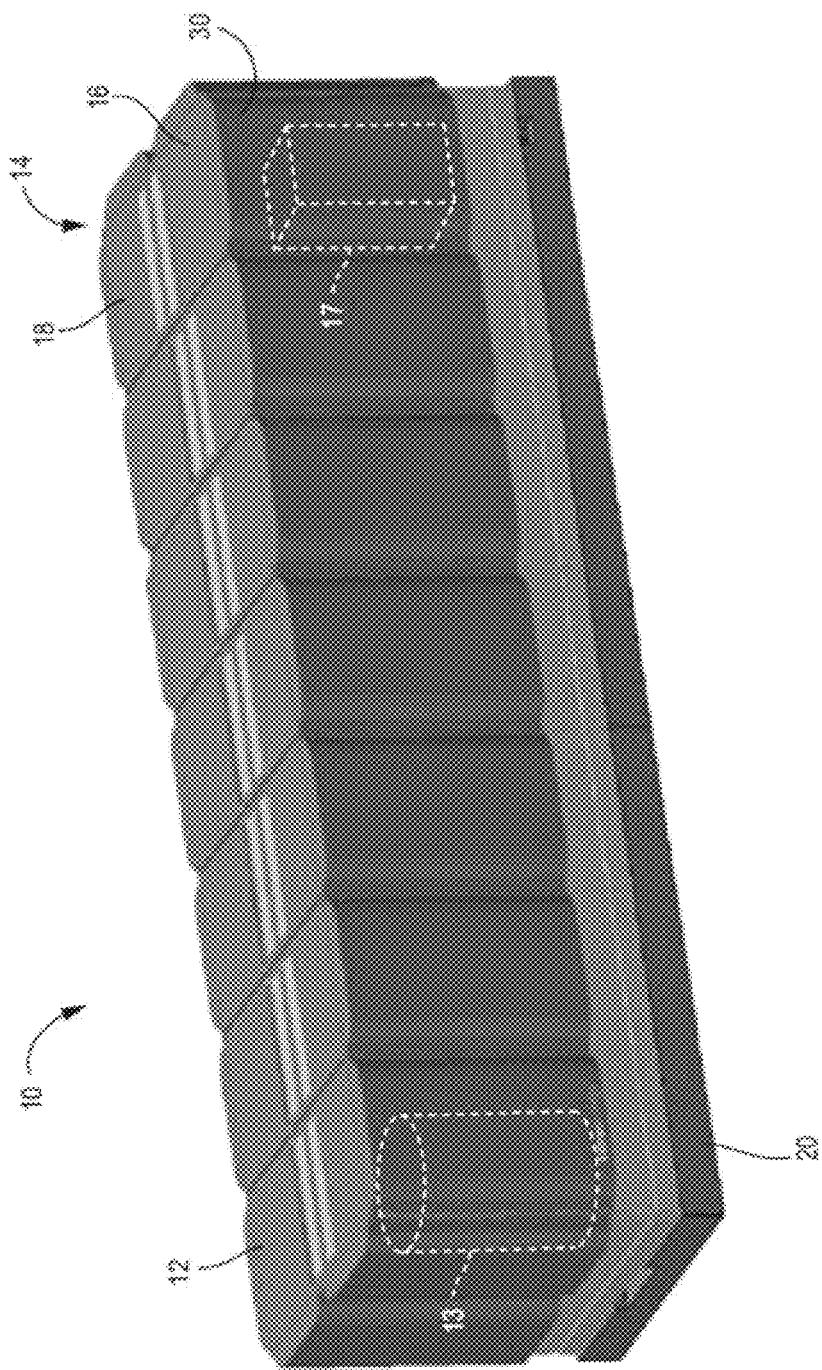
FIG. 2 is an isometric view of a prior art modular fuel cell system enclosure that can be used with the exemplary embodiments.

Fuel cell systems, such as modular fuel cell system enclosure 10, may include and/or be augmented by various pieces of support equipment. Support equipment may include various auxiliary equipment and systems to support the operation of the fuel cell system. Support equipment may vary based on constraints and/or features at a site where the fuel cell system is installed. As no limiting examples, support equipment may include, fuel support equipment, air support equipment, and/or ventilation support equipment. One type of fuel support equipment may include equipment configured to control supply and/or exhaust fuel pressure in the fuel cell system, such as a fuel blower or pump to supply fuel to, recycle fuel/exhaust in, and/or exhaust fuel from the fuel cell system. Another type of fuel support equipment may be configured to process fuel for the fuel cell system, such as a fuel pre-heater, exhaust scrubber, etc. Other types of fuel support equipment may also be used. One type of air support equipment may be air supply equipment configured to provide air into the fuel cell system and/or exhaust air from the fuel cell system, such as blowers or fans to provide air to and/or exhaust air from a fuel cell cathode, an anode tail gas oxidizer (ATO), an air heat exchanger, a CPOx reactor, etc. Other types of air support equipment may also be used. One type of ventilation support equipment may include equipment configured to ventilate from and/or circulate air in portions of housings external of the hot box (e.g., portions within modular fuel cell system enclosure 10 but external of the hot box 13 itself), such as a ventilation fan 80 to blow air from within the enclosure 10 out of the enclosure 10 to maintain an acceptable enclosure 10 pressure. Other types of ventilation support equipment may also be used. Support equipment, especially support equipment including electric motors may require Alternating Current (AC) power, for example one, two, or three phase AC power, for operation.

There may be several applications at a site where fuel cell systems, such as modular fuel cell system enclosure 10, may be installed that may require support equipment for the fuel cell systems to be powered in different modes. One mode may be a start up mode. In a start up mode, the fuel cell system may not yet be capable of producing power and the support equipment may be powered by a source other than the fuel cell system, such as the grid or another start up power source. Another mode may be a normal operation mode. In a normal operation mode the fuel cell system may supply power to the support equipment, and grid or start up power sources may also supply power or be capable of supplying power to the support equipment. In an embodiment, in normal operation mode, the parasitic load of the support equipment may be powered directly from the fuel cell system. The powering of the support equipment by the fuel cell system may be beneficial because that configuration may be an efficient mode of operation. An additional benefit may be that in the event of a grid or start up power source failure, the support equipment may already be powered by the fuel cell system and no interruption may occur in the support equipment operation. Another mode may be stand alone mode in which only power from the fuel cell system is available to the support equipment. An additional mode may be a failure mode occurring when power is not available to the support equipment, such as a grid or start up power source outage during the start up mode or a fuel cell system failure during the stand alone mode.

Figure 6:
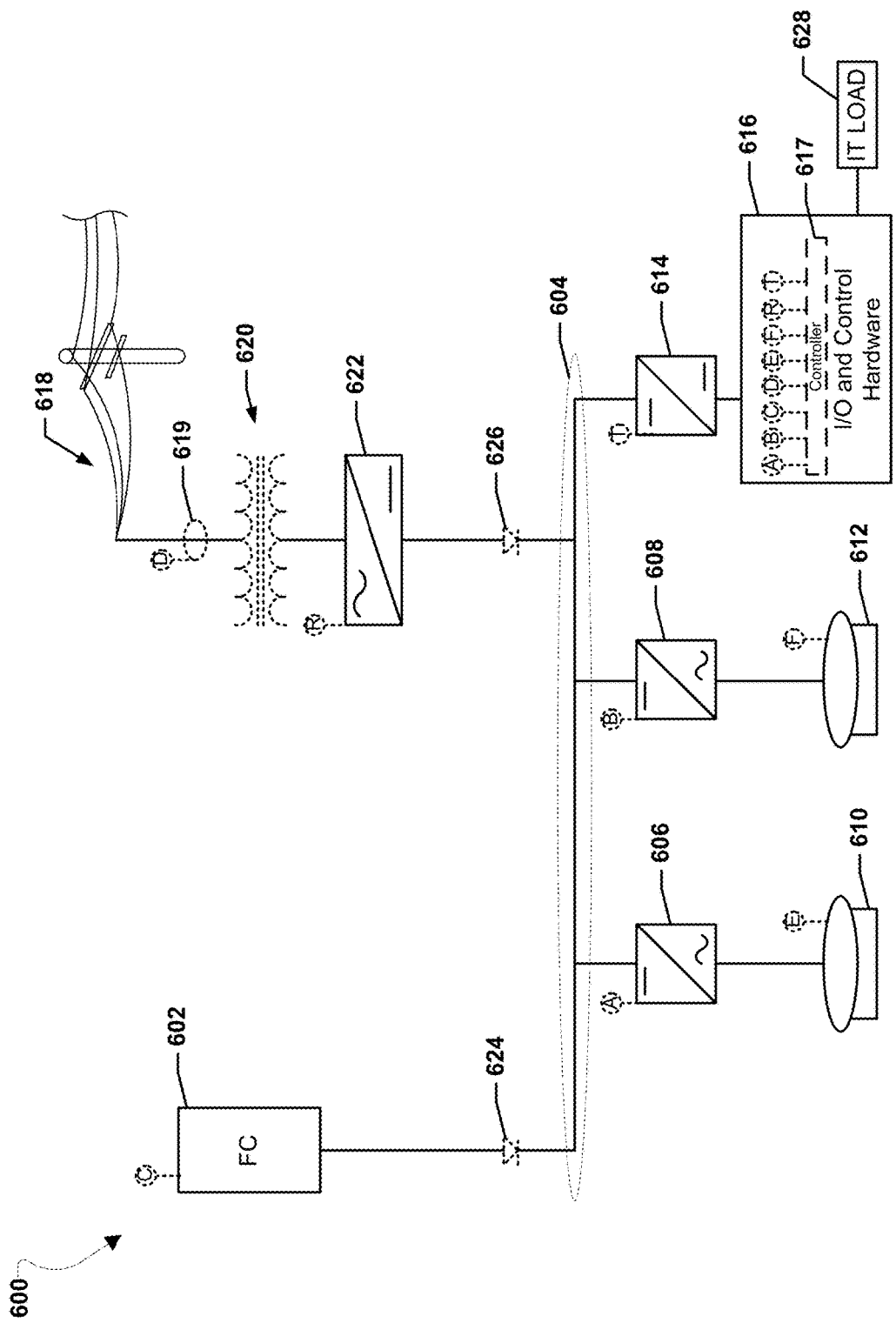
FIG. 6 is a block diagram of a fuel cell system according to an embodiment.

FIG. 6 illustrates an embodiment fuel cell system 600. The fuel cell system 600 may include a fuel cell segment 602 and fuel cell bus 604. The fuel cell segment 602 may be electrically connected to the fuel cell bus 604 and configured to provide power, such as direct current (DC) power to the fuel cell bus 604, such as 400 volt DC. In an embodiment, the fuel cell bus 604 may be a single polarity bus receiving single polarity power from the fuel cell segment 602. For example, the fuel cell segment 602 may provide positive 480 volt DC to the fuel cell bus 604 via a single connection to the fuel cell bus 604. In another embodiment, the fuel cell bus 604 may be a split bus or bipolar bus receiving bipolar DC power from more than one connection to the fuel cell segment 602, each providing a different polarity of DC power. For example, the fuel cell bus 604 may be a three wire bus in which one wire receives a positive voltage DC (e.g., positive 480 volt DC) from the fuel cell segment 602, one wire is a neutral connection to the fuel cell segment 602, and one wire receives negative voltage DC (e.g., negative 480 volt DC) from the fuel cell segment 602. In an optional embodiment, one or more optional current flow preventer devices 624, such as a diode, may be connected between the fuel cell bus 604 and fuel cell segment 602 to prevent the flow of current back from the fuel cell bus 604 to the fuel cell segment 602.

The fuel cell system 600 may also include one or more connection between a grid power source 618 and the fuel cell bus 604 and configured to provide power to the fuel cell bus 604. In an embodiment, the grid power source 618 may be an alternating current (AC) power source, such as a connection to a municipal electrical grid, providing one or more phases of AC power to the fuel cell bus 604. In an embodiment, a rectifier 622 may be electrically connected between the grid power source 618 and the fuel cell bus 622. In a further optional embodiment, an optional transformer 620, such as a step up transformer or a step down transformer, may be connected between the grid power source 618 and the rectifier 622 to transform power from the grid power source 618 to a suitable voltage for use by the rectifier 622. As an example, grid power source 618 may be a 480 volt AC, three phase, three wire power source and the transformer 620 may be a step down transformer which transforms the input from the grid power source 618 to a 240 volt AC, three phase, three wire output provided to the rectifier 622. In an embodiment, the rectifier 622 may be configured to convert the AC power from the grid power source 618 to DC power provided to the fuel cell bus 604. In an embodiment, the rectifier 622 may convert any number of AC inputs from the grid power source 618 and/or transformer 620 into any number of DC outputs to the fuel cell bus 604. For example, in an embodiment in which the fuel cell bus 604 may be a single polarity bus, the rectifier may provide positive 480 volt DC to the fuel cell bus 604 via a single connection to the fuel cell bus 604. As another example, in an embodiment in which the fuel cell bus 604 may be a split bus or bipolar bus providing bipolar DC power on more than one line, the rectifier 622 may output a positive voltage DC (e.g., positive 480 volt DC) to the fuel cell bus 604 on a first connection, have a second neutral connection to the fuel cell bus 604, and output a negative voltage DC (e.g., negative 480 volt DC) to the fuel cell bus 604 on a third connection. In an optional embodiment, one or more optional current flow preventer devices 626, such as a diode, may be connected between the fuel cell bus 604 and rectifier 622 to prevent the flow of current back from the fuel cell bus 604 to the rectifier 622.

In an embodiment, a variable frequency drive 606 may be electrically connected to the fuel cell bus 604. One or more additional variable frequency drive(s) 608 may also be electrically connected (e.g., in parallel with variable frequency drive 606) to the fuel cell bus 604. In an embodiment, the variable frequency drives 606, 608 may be configured to receive power from the fuel cell bus 604 and generate a variable frequency power output. In an embodiment, the variable frequency drives 606, 608 may be variable frequency drives similar to the variable frequency drive 700 discussed further below with reference to FIG. 7.

Figure 3:
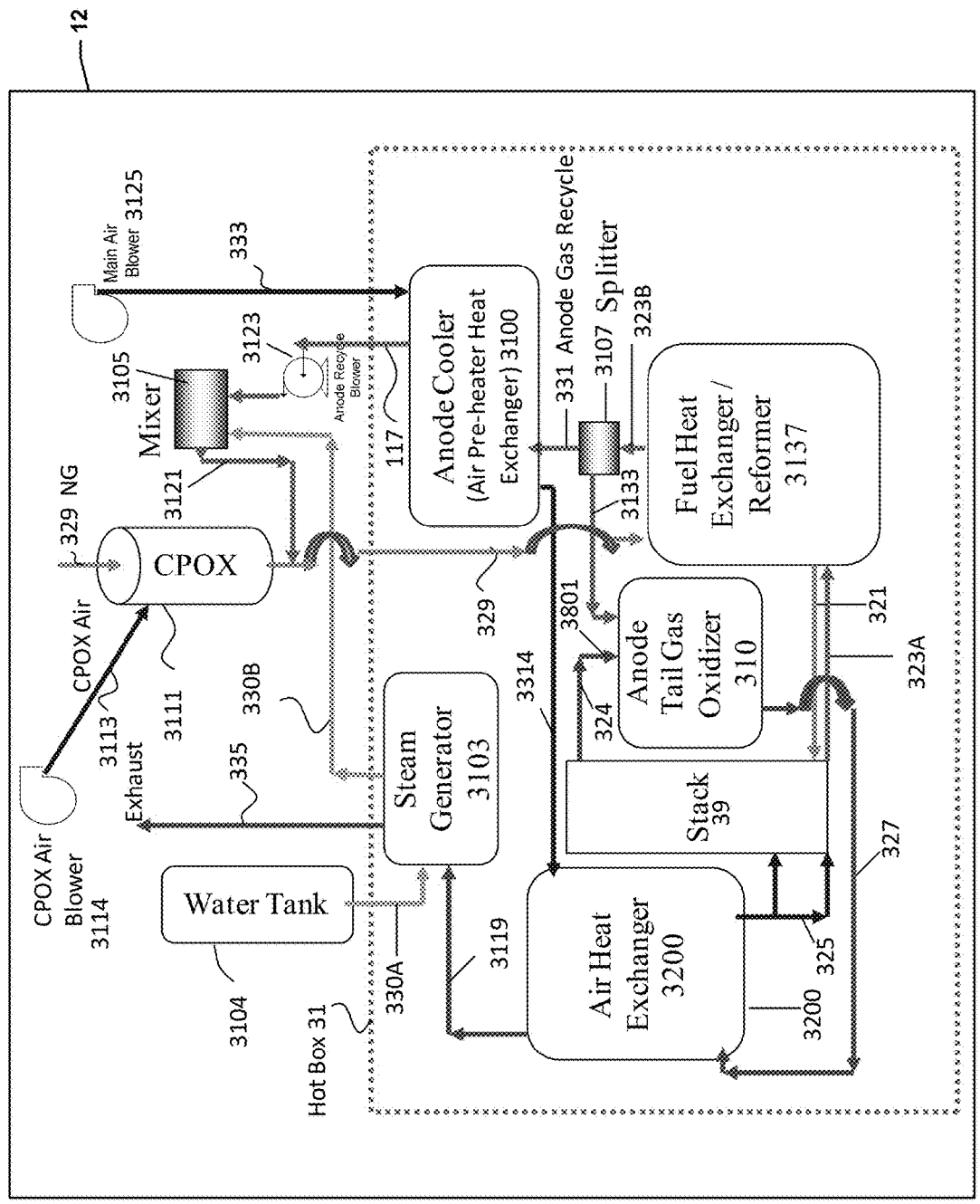
FIG. 3 is a schematic process flow diagram illustrating a prior art hot box that can be used with the exemplary embodiments.

The variable frequency drives 606, 608 may receive a DC input from the fuel cell bus 604 and use the DC input from the fuel cell bus 604 to generate a variable frequency power output, such as a pulse width modulated (PWM) waveform which may be controlled for voltage and/or current to approximate a desired AC power output. The variable frequency drive 606 may be electrically connected to a support equipment 610 (e.g., a fuel exhaust blower, such as an anode recycle blower 3123 shown in FIG. 3, which may control the rate of fuel exhaust recycled into a fuel inlet stream) and the support equipment 610 may receive the variable frequency power output from the variable frequency drive 606. The variable frequency power output from the variable frequency drive 606 may drive the support equipment 610 and controlling the variable frequency power output from the variable frequency drive 606 may enable the operation of the support equipment 610 to be controlled. For example, the support equipment 610 may be a motor and the frequency and/or voltage of the PWM waveform of the variable frequency power output from the variable frequency drive 606 may be varied to control the speed and/or torque of the motor. The variable frequency drive 608 may be electrically connected to a support equipment 612 (e.g., an air blower, such as blower 3125 shown in FIG. 3, which controls an amount of air provided into the fuel cell segment 602) and the support equipment 612 may receive the variable frequency power output from the variable frequency drive 608. The variable frequency power output from the variable frequency drive 608 may drive the support equipment 612 and controlling the variable frequency power output from the variable frequency drive 608 may enable the operation of the support equipment 612 to be controlled. For example, the support equipment 612 may be a motor and the frequency and/or voltage of the PWM waveform of the variable frequency power output from the variable frequency drive 608 may be varied to control the speed and/or torque of the motor.

Figure 4:
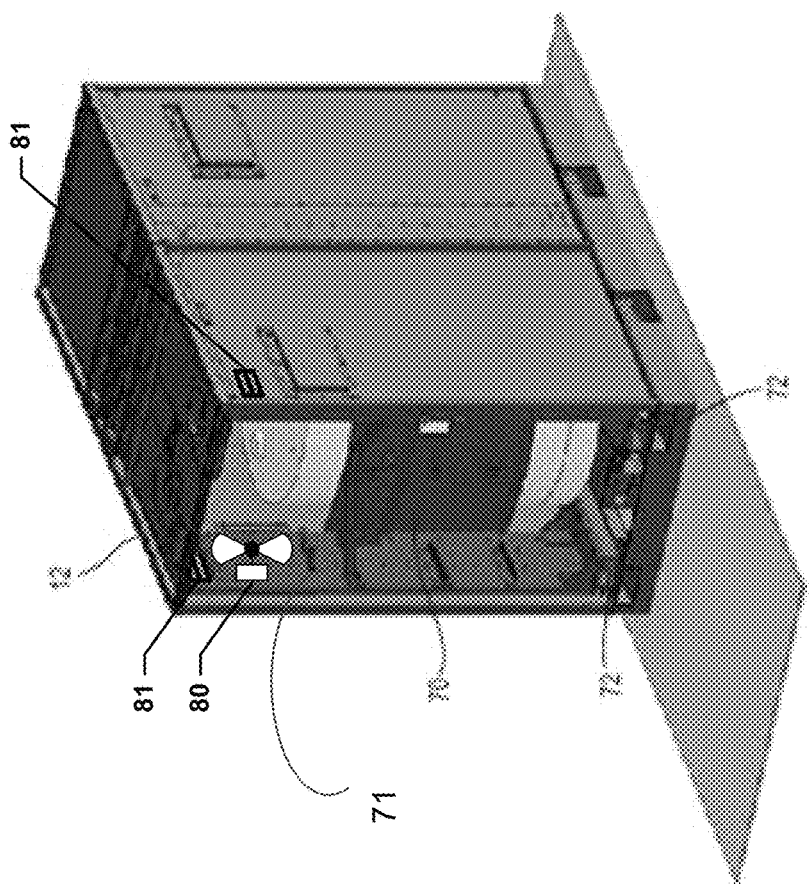
FIG. 4 is an isometric view of a hot box of the prior art modular fuel cell system of FIG. 2.
Figure 5:
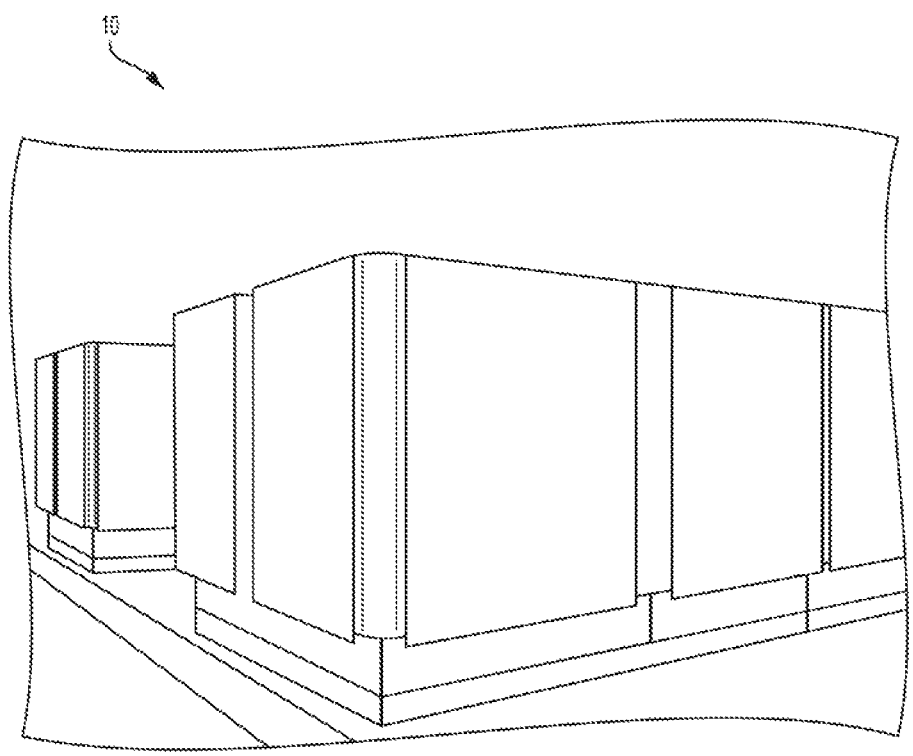
FIG. 5 is photograph of the housing of the prior art modular fuel cell system of FIG. 2.

In an embodiment, the support equipment 610, 612 may both be pieces of support equipment, such as motors of the blowers, of the air system and/or fuel system of the fuel cell segment 602 or may both be pieces of support equipment, such as motors of the blowers or fans (e.g., fan 80 shown in FIG. 4), of the ventilation system of the fuel cell segment 602. In an embodiment in which the fuel cell bus 604 is a bipolar or split bus, variable frequency drive 606 may be connected to different portions of the fuel cell bus 604 than variable frequency drive 608. As an example, variable frequency drive 606 may be connected to a positive portion of the fuel cell bus 604 and variable frequency drive 608 may be connected to a negative portion of the fuel cell bus 604. Alternatively, in an embodiment in which the fuel cell bus 604 is a bipolar or split bus, variable frequency drive 606 and variable frequency drive 608 may both be connected to the same portion or portions of the fuel cell bus 604.

In an embodiment, various input/output (I/O) hardware and control hardware 616, such as IOM 104 discussed above and/or a controller 617, may be electrically connected to the fuel cell bus 604 and receive power from the fuel cell bus 604. In an embodiment, a DC to DC converter 614 may be connected between the fuel cell bus 604 and the I/O and control hardware 617 to convert DC power from the fuel cell bus 604 to DC power appropriate for the I/O and control hardware 616. As an example, DC to DC converter 614 may convert 480 volt DC power received from the fuel cell bus 604 to 24 volt DC power to be provided to the I/O and control hardware 616. In an embodiment, the I/O and control hardware 616 may be electrically connected to an IT load 628, and in this manner the IT load 628 may be electrically connected to the fuel cell bus 604 and receive DC power from the fuel cell bus 604.

In an embodiment, one or more of the variable frequency drives 606, 608, and/or the DC to DC converter 614 may be fully isolated devices providing galvanic isolation between the support equipment 610, 612, and/or I/O and control hardware 616, respectively, and the fuel cell bus 604. In an embodiment, all of the variable frequency drives 606, 608, and the DC to DC converter 614 may provide galvanic isolation between the support equipment 610, 612, and/or I/O and control hardware 616, respectively, and the fuel cell bus 604. In another embodiment, only a portion, or none, of the one or more of the variable frequency drives 606, 608, and/or the DC to DC converter 614 may provide isolation as long as isolation is provided at least at one point in the fuel cell system 600.

In an embodiment, the controller 617 may be in communication with various elements of the fuel cell system 600 via wired and/or wireless connections, such as connections A, B, C, D, E, F, R, and T with one or more of the variable frequency drives 606, 608, one or monitors (e.g., a thermocouple to measure temperature, a voltage meter, current meter, etc.) associated with the fuel cell segment 602 and/or DC to DC or AC to DC converters associated with the fuel cell segment 602, one or more of the support equipment 610, 612, the rectifier 622, DC to DC converter 614, and/or a current and/or voltage monitor 619 (e.g., voltmeter or ammeter) monitoring the input from the grid power supply 618. The controller 617 may be configured to receive information from the one or more of the variable frequency drives 606, 608, one or more of the support equipment 610, 612, the fuel cell segment 602 monitors, the rectifier 622, DC to DC converter 614, and/or a current and/or voltage monitor 619 and send commands to the one or more of the variable frequency drives 606, 608, one or more of the support equipment 610, 612, the fuel cell segment 602 monitors, the rectifier 622, DC to DC converter 614, and/or a current and/or voltage monitor 619. In this manner, the controller 617 may monitor and control the state of the fuel cell system 600 and the various elements of the fuel cell system 600. In an embodiment, the controller 617 may be a processor configured with processor-executable instructions to perform operations to monitor and control the state of the fuel cell system 600 and the various elements of the fuel cell system 600. As an example, the controller 617 may receive inputs from the fuel cell segment 602 monitors regarding temperature and/or power output and send commands to start-up or shut-down the fuel cell segment 602, the controller 617 may send commands to one or more of the variable frequency drives 606, 608 to control the variable frequency drives 606, 608 and via the variable frequency outputs of the variable frequency drives 606, 608 control the support equipment 610, 612 (e.g., decrease or increase air flow rate and/or fuel exhaust recycle rate), respectively, the controller 617 may receive inputs from the support equipment 610, 612 regarding their operating states, such as revolutions per minute (RPM) (e.g., which corresponds to the fuel exhaust recycle rate and air inlet flow rate), the controller 617 may send commands to the rectifier 622 to control the operation of the rectifier 622 to isolate the grid power source 618 from the fuel cell bus 604, and/or the controller 617 may receive current and/or voltage information from the current and/or voltage monitor 619 reflecting the state of the power from the grid power source 618.

In operation, the fuel cell segment 602 may generate DC power and provide the DC power to the fuel cell bus 604 and/or the grid power source 618 may provide AC power to the rectifier 622 which may convert the AC power to DC power provided to the fuel cell bus 604. In a fuel cell stand alone mode of operation, the fuel cell segment 602 may only provide DC power to the fuel cell bus 604 and the rectifier 622 may be controlled to isolate the grid power source 618 such that power from the grid power source 618 is not provided to the fuel cell bus 604. Additionally, a fuel cell stand alone mode of operation may occur when power is unavailable from the grid power source 618, such as during a grid failure. In a grid power stand alone mode of operation, the fuel cell segment 602 may not provide DC power to the fuel cell bus 604 and only power from the grid power source 618 may be provided to the fuel cell bus 604. In an embodiment, a grid power stand alone mode of operation may be a start-up mode for the fuel cell system 600 used to provide power to the fuel cell bus 604 when the fuel cell segment 602 is off line or unable to provide sufficient power (e.g., during fuel cell segment 602 start up) to meet a power requirement placed on the fuel cell bus 604.

In an embodiment, the controller 617 may be configured such that when the controller 617 determines that one of the support equipment 610, 612 has failed, the variable frequency drive 606, 608 connected to the support equipment 610, 612 that did not fail may be controlled to control the support equipment 610,612 that did not fail to meet a requirement of the fuel cell system 600, such as a requirement of the fuel system of the fuel cell segment 602 or a requirement of the ventilation system of the fuel cell segment 602. As an example, the controller 617 may determine that the support equipment 610 connected to variable frequency drive 606 has failed (e.g., the support equipment 610 is a fuel recycle blower that has seized or an air blower that has seized), and may control the variable frequency drive 606 to stop providing power to the support equipment 610 while also controlling the variable frequency drive 608 to generate a variable frequency power output to the support equipment 612 that did not fail to meet the requirement of the fuel system or air system of the fuel cell segment 602 (e.g., generating a PWM waveform resulting in an increased recycling rate of the support equipment 612 which may be a backup fuel recycle blower that did not fail and/or increased pumping rate of the support equipment 612 which may be a backup air blower). In such an example, the fuel system or air system may maintain the same overall recycling/pumping rate, though only one support equipment 612 recycling blower or air blower remains operational. In this manner, the fuel cell system may achieve redundancy in the system associated with the support equipment 606, 608.

Figure 7:
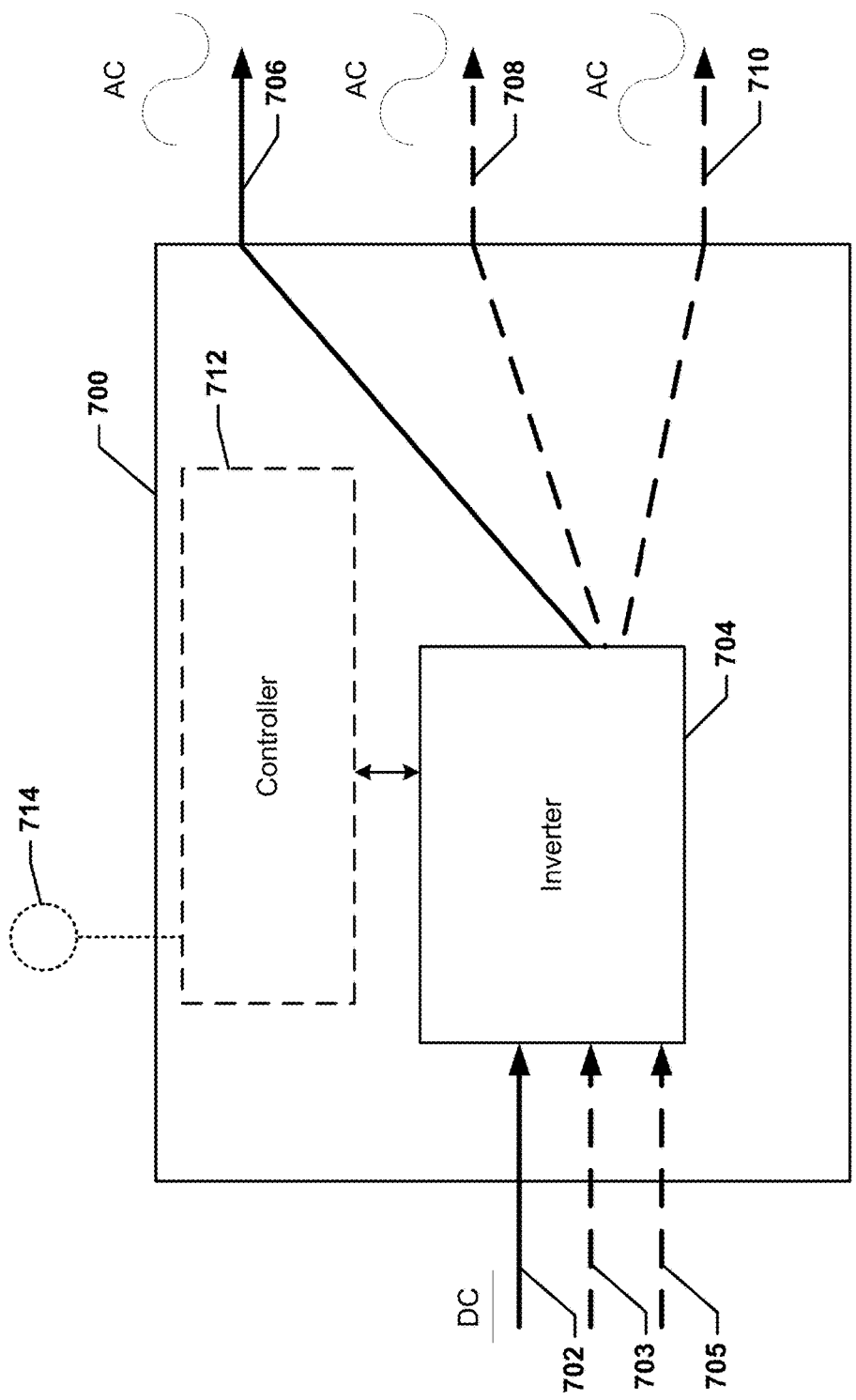
FIG. 7 is a block diagram of a variable frequency drive suitable for use with the various embodiments.

FIG. 7 illustrates an embodiment variable frequency drive 700 suitable for use with the various embodiments. The variable frequency drive 700 may be specifically suited to configurations in which only DC power may be available from a bus, such as fuel cell system 600 described above with reference to FIG. 6. The variable frequency drive 700 may include at least one DC input 702. Optionally, the variable frequency drive 700 may include additional DC inputs 703 and 705. The additional of the optional additional DC inputs may enable the variable frequency drive 700 to be connected to multi-polar buses. As an example, DC input 702 may be a positive DC input, DC input 703 may be a neutral connection, and DC input 705 may be a negative DC input. The DC inputs 702, 703, and 705 may provide DC power to an inverter 704 (e.g., a DC to AC inverter) coupled to a controller 712. In an embodiment, the controller 712 may be a controller on board the variable frequency drive 700. In another embodiment, the controller 712 may be a controller remote from the variable frequency drive 700, such as controller 616 discussed above with reference to FIG. 6. In an embodiment, the controller 712 may control the operation of the inverter 704 to generate a pulse width modulated (PWM) waveform from the DC power the inverter 704 receives and output the PWM waveform on at least one AC output 706. Optionally, the inverter may output PWM waveforms on more than one optional additional AC outputs 708 and 710. The inclusion of various AC outputs 706, 708, and/or 710 may enable the variable frequency drive 700 to generate one, two, or three phase variable frequency power outputs which may be used to control the operation of one, two, or three phase support equipment, respectively. In an embodiment, the controller 712 may send and/or receive information via one or more connections 714 (e.g., such as one or more connection to controller 616 discussed above with reference to FIG. 6). As an example, the controller 712 may receive control instructions (e.g., from controller 616) controlling the controller 712 to cause the inverter to generate PWM waveforms to control the operation of support equipment connected to the AC outputs 706, 708, and/or 710 of the variable frequency drive 700.

Figure 8:
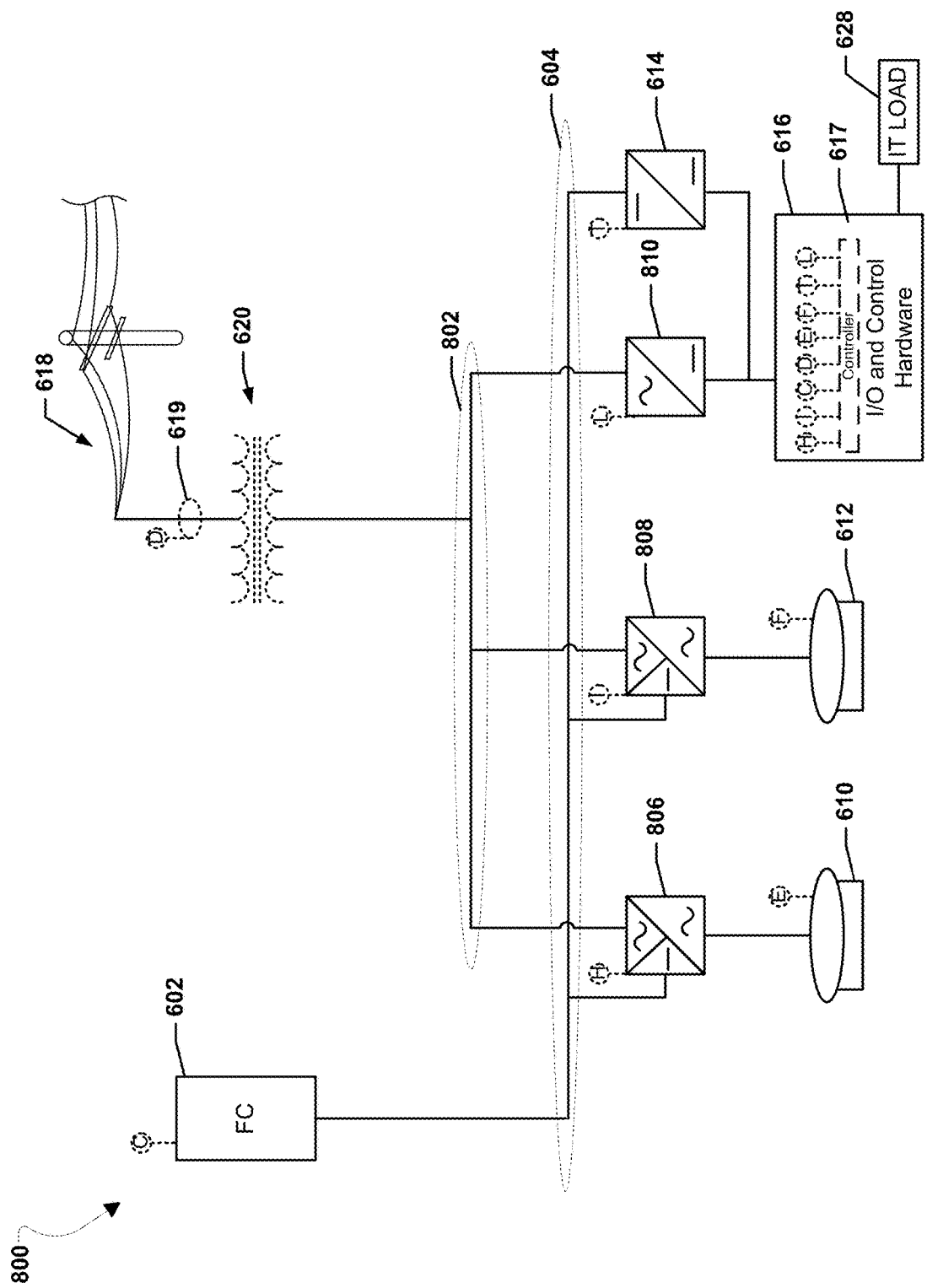
FIG. 8 is a block diagram of a fuel cell system according to another embodiment.

FIG. 8 illustrates an embodiment fuel cell system 800. Fuel cell system 800 is similar to fuel cell system 600 illustrated in FIG. 6 and contains a number of components in common. Those components which are common to both fuel cell system 600 and 800 are numbered the same in FIGS. 6 and 8 and will not be described further.

One difference between the fuel cell systems 600 and 800 is the fuel cell system 800 may include a separate fuel cell bus 604 and AC bus 802. Because the fuel cell bus 604 and AC bus 802 may be separate buses, the rectifier 622 may not be required to convert the AC power from the grid power source 618 to DC power provided to the fuel cell bus 604. Rather, in fuel cell system 800 rectifiers internal to the variable frequency drives 806 and 808 may be relied on to convert AC power to DC power for use by the variable frequency drives 806 and 808. The use of the internal rectifiers of the variable frequency drives 806 and 808 may be make fuel cell system 800 more efficient than fuel cell system 600. The AC bus 802 may be a one, two, or three phase AC bus receiving AC power from the grid power source 618. Variable frequency drives 806 and 808 may be electrically connected to the AC bus 802. Variable frequency drives 806 and 808 may also be electrically connected to the fuel cell bus 604. The variable frequency drives 806 and 808 may be variable frequency drives configured to receive DC power and/or AC power and generate a variable frequency power output, such as the variable frequency drive 900 described below with reference to FIG. 9. The variable frequency drives 806 and 808 may be electrically connected to support equipment 610 and 612, respectively, and provide a variable frequency power output to their respective support equipment 610 and 612. A rectifier 810 (e.g., an AC to DC converter) may be connected between the AC bus 802 and the I/O and control hardware 616 to convert AC power from the AC bus 802 to DC power provided to the I/O and control hardware 616. As an example, the rectifier 810 may convert 240 volt AC power from the AC bus 802 to 24 volt DC power provided to the I/O and control hardware 616. In an embodiment, the controller 617 may additionally be in communication with the rectifier 810 and/or the variable frequency drives 806, 808 via wired and/or wireless connections, such as connections H, I, and L with one or more of the rectifier 810 and/or the variable frequency drives 806, 808. The controller 617 may be configured to receive information from the one or more of the rectifier 810 and/or the variable frequency drives 806, 808 and send commands to the one or more of the rectifier 810 and/or the variable frequency drives 806, 808. In this manner, the controller 617 may monitor and control the state of the fuel cell system 800 and the various elements of the fuel cell system 800.

In operation, the fuel cell segment 602 may generate DC power and provide the DC power to the fuel cell bus 604 and/or the grid power source 618 may provide AC power to the AC bus 802. In a fuel cell stand alone mode of operation, the fuel cell segment 602 may only provide DC power to the fuel cell bus 604 and the variable frequency drives 806, 808, and rectifier 810 may be controlled to isolate the AC bus 802 such that power from the AC bus 802 is not used by the variable frequency drives 806, 808, and rectifier 810 to provided power to the support equipment 610, 612, and I/O and control hardware 616. Additionally, a fuel cell stand alone mode of operation may occur when power is unavailable from the grid power source 618, such as during a grid failure, and thus AC power may not be available on the AC bus 802. In a grid power stand alone mode of operation, the fuel cell segment 602 may not provide DC power to the fuel cell bus 604 and/or the variable frequency drives 806, 808, and DC to DC converter 614 may be controlled to isolate the fuel cell bus 604 such that power from the fuel cell bus 604 is not used by the variable frequency drives 806, 808, and DC to DC converter 614 to provide power to the support equipment 610, 612, and I/O and control hardware 616. Thus, in a grid power stand alone mode, only power from the AC bus may be provided to the variable frequency drives 806, 808. In an embodiment, a grid power stand alone mode of operation may be a start-up mode for the fuel cell system 800 used to provide power to the support equipment 610, 612, and I/O and control hardware 616 when the fuel cell segment 602 is off line or unable to provide sufficient power (e.g., during fuel cell segment 602 start up) to meet a power requirement placed on the fuel cell bus 604. In an embodiment, the controller 617 may be configured to determine whether power is available from the AC bus 802 and/or grid power source 618 and control the operation of the variable frequency drives 806 and 808 to not draw power from the fuel cell bus 604 while power is available from the AC bus 802, thereby operating the support equipment 610 and 612 in an AC stand alone mode.

Figure 9:
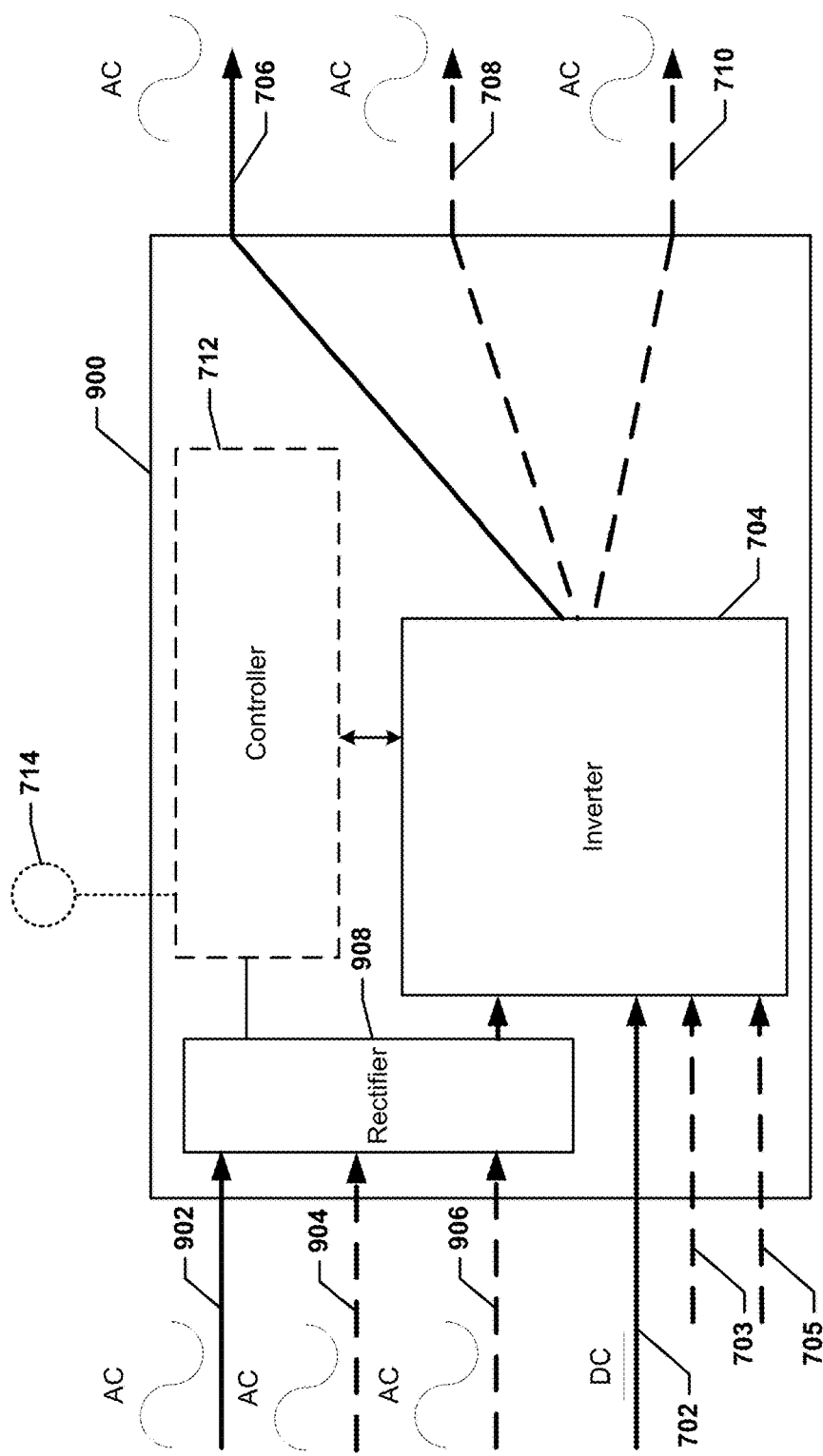
FIG. 9 is a block diagram of another variable frequency drive suitable for use with the various embodiments.

FIG. 9 illustrates an embodiment variable frequency drive 900 suitable for use with the various embodiments. Variable frequency drive 900 similar to variable frequency drive 700 illustrated in FIG. 7 and contains a number of components in common. Those components which are common to both variable frequency drives 700 and 900 are numbered the same in FIGS. 7 and 9 and will not be described further.

One difference between the variable frequency drive 700 and variable frequency drive 900 is that variable frequency drive 900 may receive one or more AC inputs, such as AC input 902 and additional optional AC inputs 904 and 906. In an embodiment, a single AC input 902 may be provided when the variable frequency drive 900 is connected to a single wire single phase AC bus, and additional AC inputs 904 and/or 906 may be provided when the variable frequency drive is connected to a multi-phase, multi-wire AC bus, such as a three phase, three wire AC bus. The AC inputs 902, 904, and 906 may be provided to an internal rectifier 908 of the variable frequency drive 900. The internal rectifier 908 may be coupled to the controller 712 (e.g., a controller on board the variable frequency drive 900 or a controller remote to the variable frequency drive, such as controller 616 described above with reference to FIG. 8) and the controller 712 may be configured to control the operation of the internal rectifier 908 to convert the AC power from the AC inputs 902, 904, and 906 to a DC output provided to the inverter 704. In this manner, the inverter 704 may directly receive DC power from DC inputs 702, 703, and 705 and/or AC inputs 902, 904, and 906 indirectly from rectifier 908. The variable frequency drive 900 may be specifically suited to configurations in which AC and/or DC power may be available from one or more buses, such as fuel cell system 800 described above with reference to FIG. 8. In an embodiment, the controller 712 may control the operation of the inverter 704 and/or rectifier 908 to control whether AC power from the AC inputs 902, 904, 906 converted to DC power by rectifier 908 is used by the inverter 704 to generate a PWM waveform or whether DC power from the DC inputs 702, 703, 705 is used by the inverter 704 to generate the PWM waveform. Additionally, the controller 712 may control the operation of the inverter 704 and/or rectifier 908 to generate the PWM waveform from a combination of the DC power the inverter 704 receives from the rectifier 908 and the DC power received directly from the DC inputs 702, 703, 705.

Figure 10:
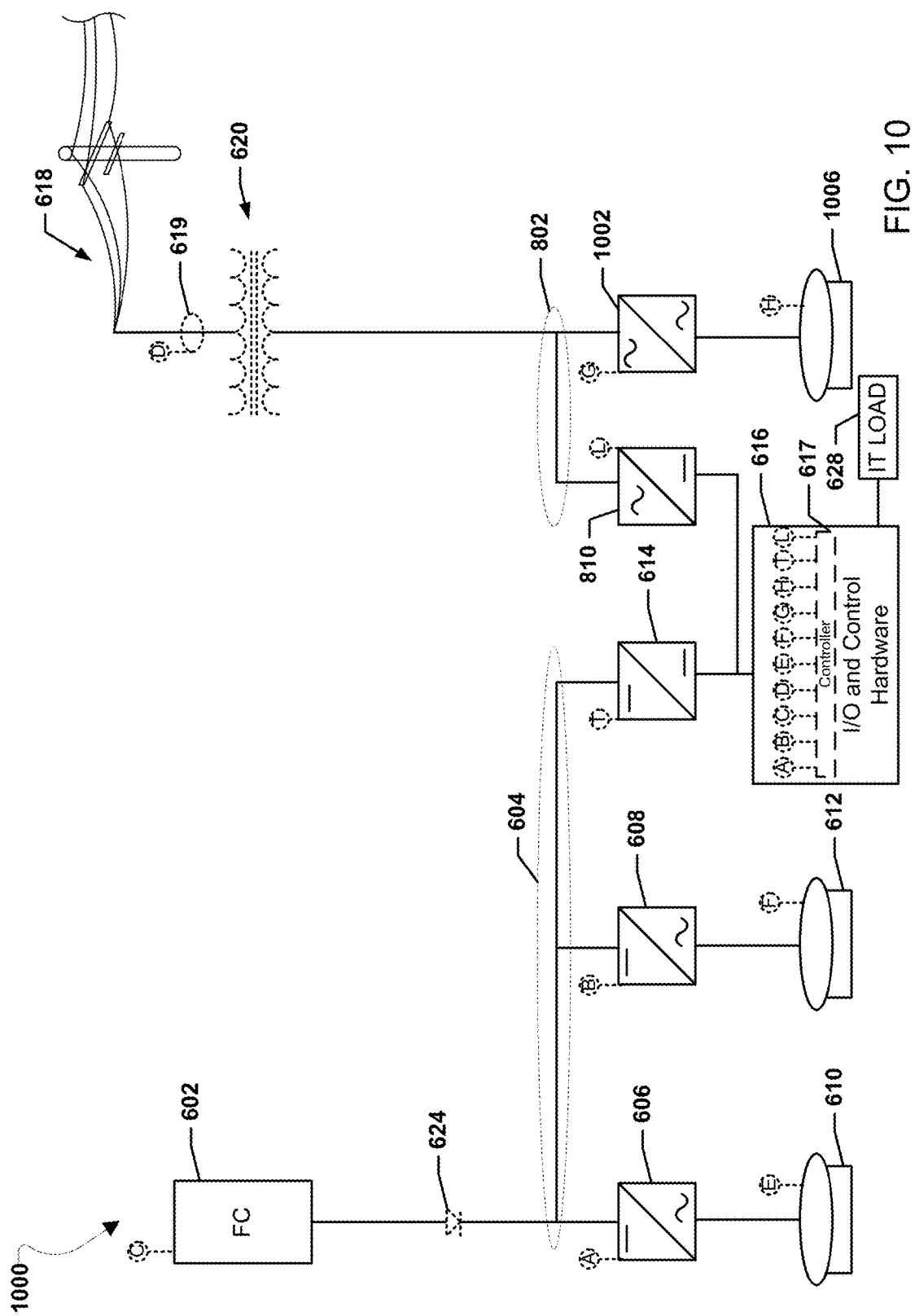
FIG. 10 is a block diagram of a fuel cell system according to a further embodiment.

FIG. 10 illustrates an embodiment fuel cell system 1000. Fuel cell system 1000 is similar to fuel cell system 800 illustrated in FIG. 8 and contains a number of components in common. Those components which are common to both fuel cell system 800 and 1000 are numbered the same in FIGS. 8 and 10 and will not be described further.

One difference between the fuel cell systems 800 and 1000 is the fuel cell system 1000 may include a variable frequency drive 1002 electrically connected to only the AC bus 802 and its own support equipment 1006 powered only from the AC bus 802. In this manner, variable frequency drives 606 and 608 and their respective support equipment 610 and 612 may be powered independently by the fuel cell bus 604 and variable frequency drive 1002 and its respective support equipment 1006 may be powered independently by the AC bus 802. The variable frequency drive 1002 may be a variable frequency drive configured to receive only AC power and generate a variable frequency power output, such as the variable frequency drive 1100 described below with reference to FIG. 11. In operation, the fuel cell segment 602 may provide power to the support equipment 610 and 612 via the fuel cell bus 604 and variable frequency drives 606 and 608, respectively and/or to the I/O and control hardware 616 via the DC to DC converter 614 and fuel cell bus 604. The gird power source 618 may provide power to the support equipment 1006 via the AC bus 802 and variable frequency drive 1002 and/or to the I/O and control hardware 616 via the rectifier 810 and AC bus 802. In an embodiment, the controller 617 may additionally be in communication with the variable frequency drive 1002 and the support equipment 1006 via wired and/or wireless connections, such as connections G and H with one or more of the variable frequency drive 1002 and the support equipment 1006. The controller 617 may be configured to receive information from the one or more of the variable frequency drive 1002 and the support equipment 1006 and send commands to the one or more of the variable frequency drive 1002 and the support equipment 1006. In this manner, the controller 617 may monitor and control the state of the fuel cell system 1000 and the various elements of the fuel cell system 1000.

In an embodiment, the support equipment 610, 612, and 1006 may all be pieces of support equipment, such as blower or pump motors, of the fuel system of the fuel cell segment 602, may all be pieces of support equipment, such as blower or pump motors, of the air system of the fuel cell segment 602, or may all be pieces of support equipment, such as blower or pump motors, of the ventilation system associated with the fuel cell segment 602. In an embodiment, the support equipment 1006 may be a startup fuel and/or air blower which may be sized to only support start up requirements of the fuel cell segment 602. In an embodiment, the support equipment 1006 may be only operated during a start up mode or state of the fuel cell segment 602 and stopped once the fuel cell segment 602 reaches a normal operating state (i.e., steady state operating mode for generating power). For example, support equipment 1006 may be a CPOx air blower which provides air to the CPOx only during start up (such as blower 3114 shown in FIG. 3). In an embodiment, the controller 617 may be in communication with the variable frequency drive 1002 and support equipment 1006. In an embodiment, the controller 617 may be configured to control the operation of the variable frequency drive 1002 to provide the variable frequency drive power output from the variable frequency drive 1002 to the support equipment 1006 when the fuel cell segment 602 and/or the overall fuel cell system 1000 is in a start up state mode. In a further embodiment, when the fuel cell segment 602 and/or fuel cell system 1000 is in a start up state, the controller 617 may control the variable frequency drives 606 and 608 to not provide a variable frequency drive power output to the support equipment 610 and 612. In an embodiment, the controller 617 may be configured to control the operation of the variable frequency drive 1002 to stop providing the variable frequency drive power output from the variable frequency drive 1002 to the support equipment 1006 when the fuel cell segment 602 and/or the overall fuel cell system 1000 exits a start up state (i.e., the CPOx reactor air blower is turned off as the system exits the start up mode, and the air inlet blower and the fuel exhaust recycle blower operate during the steady state mode).

Figure 11:
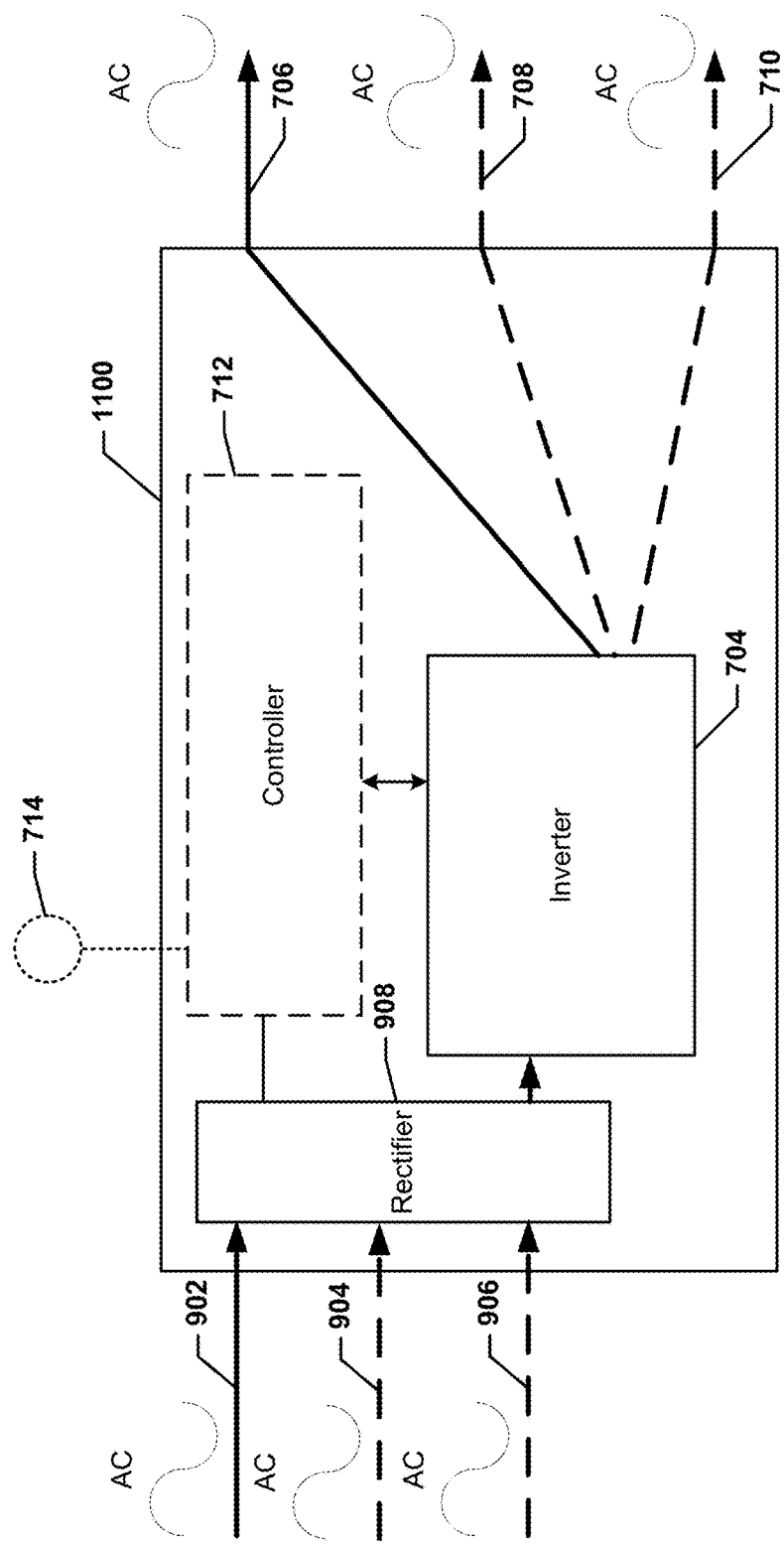
FIG. 11 is a block diagram of a third variable frequency drive suitable for use with the various embodiments.

FIG. 11 illustrates an embodiment variable frequency drive 1100 suitable for use with the various embodiments. Variable frequency drive 1100 similar to variable frequency drive 900 illustrated in FIG. 9 and contains a number of components in common. Those components which are common to both variable frequency drives 900 and 1100 are numbered the same in FIGS. 9 and 11 and will not be described further.

One difference between the variable frequency drive 900 and variable frequency drive 1100 is that variable frequency drive 1100 may receive only receive one or more AC inputs 902, 904, 906, and may not receive any DC inputs. In this manner, the only power available to the inverter 704 may be from the internal rectifier 908 of the variable frequency drive 1100.

In the various embodiments, operating the support equipment in grid power stand alone mode may enable the grid power source to be the main source of power for the support equipment because the fuel cell may be cable of operating in a stand alone mode as a back up in the event of a grid power failure or because 100 percent of the DC power from the fuel cell segment 602 must be provided to the DC load 628. In an embodiment, grid power may be used in a startup mode to operate support equipment, for example all blowers, and then when the fuel cell segment 602 reaches steady state, the one or more blower (e.g., blower 3114 shown in FIG. 3) may be turned off and/or other blowers (e.g., blower 3123 and/or 3125 shown in FIG. 3) may be switched to DC power from the fuel cell segment 602. In the various embodiments, a combination of power modes may be employed. For example, the I/O and control hardware may be operated with power from the grid power source while the support equipment may be operated with power from the fuel cell. Additionally, in a start up mode, support equipment may be operated sequentially. As an example, initially only a first variable frequency drive may be started and a first connected support equipment provided a PWM waveform using power from the grid power source. In this manner, the demand of power on the grid power source may be reduced during start up if all variable frequency drives and support equipment may not be required to meet start up requirements.

In the various embodiments, operating support equipment in a stand alone fuel cell mode may isolate the support equipment from ground faults and electrical noise. Support equipment may be susceptible to ground faults. Powering support equipment from a fuel cell source may mitigate and reduce the exposure to ground faults. Typically, a facility utilizing support equipment is designed such that the highest magnitude of an allowable ground fault may be the point of common coupling with a utility or grid power source and would descend in magnitude within the facility. If the support equipment is not installed electrically close to the facility main in coming feed the potential for the cascading effect to limit the magnitude for support equipment ground fault can be an issue. If powered from the fuel cell system the ability to deliver a larger magnitude of ground fault may be possible and therefore mitigate the lack of facility ground fault magnitude contribution. If the main incoming utility feed has ground fault protection installing support equipment introduces a risk to the facility due to the high likelihood of a ground fault tripping the main feed breaker. Powering support equipment from a fuel cell system can mitigate this facility risk. Since support equipment is not typical, facilities may not be cable of tailoring their ground fault protection scheme to the needs of the support equipment. Powering support equipment from a fuel cell system in which the power generator can easily adapt its ground fault tolerance specific to that of the support equipment can mitigate costly infrastructure in ways of ground fault protection schemes.

In an embodiment, as the motor component of support equipment slows down for any given reason the variable frequency drives discussed above may include the capability to regeneratively break the motor and provide energy captured during regenerative breaking back to the DC bus. In one embodiment, regenerative breaking may be provided through auxiliary loads, for example through a DC to DC converter powering the I/O and control hardware. In another embodiment, power may be provided back to the DC bus to add stability which may be particularly useful in stand alone and failure operating modes.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A fuel cell system, comprising:
a fuel cell bus comprising single polarity bus;
a fuel cell segment electrically connected to the fuel cell bus and configured to provide power to the fuel cell bus;
a first variable frequency drive electrically connected to the fuel cell bus and configured to receive power from the fuel cell bus and generate a first variable frequency power output;
a first support equipment electrically connected to the first variable frequency drive, the first support equipment configured to receive the first variable frequency power output from the first variable frequency drive and configured to support operation of the fuel cell segment in providing power to the fuel cell bus;
a second variable frequency drive electrically connected to the fuel cell bus and configured to receive direct current (DC) power from the fuel cell bus and generate a second variable frequency power output;
a second support equipment electrically connected to the second variable frequency drive and configured to receive the second variable frequency power output from the second variable frequency drive, wherein the first support equipment and the second support equipment are both blower, pump, or fan motors of a fuel support equipment, air support equipment, or ventilation support equipment;
a grid power source connector configured to connect an alternating current (AC) grid power source to the fuel cell bus to provide power to at least one of the fuel cell bus, the first support equipment, or the second support equipment;
a rectifier is electrically connected between the grid power source and the fuel cell bus, the rectifier configured to convert AC power from the grid power source to DC power provided to the fuel cell bus; and
a controller in communication with the first variable frequency drive and the second variable frequency drive, wherein the controller is configured to control the operation of the first variable frequency drive and the second variable frequency drive such that when one of the first support equipment or the second support equipment fails the first variable frequency drive or the second variable frequency drive connected to the first support equipment or the second support equipment that did not fail controls the first support equipment or the second support equipment that did not fail.

2. The fuel cell system of claim 1, wherein the first support equipment is a fuel exhaust recycle blower and the second support equipment is an air inlet blower.

3. The fuel cell system of claim 1, further comprising: an information technology (IT) load electrically connected to the fuel cell bus and configured to receive DC power from the fuel cell bus.

4. The fuel cell system of claim 1, further comprising: a controller in communication with the rectifier, wherein the controller is configured to control the operation of the rectifier to isolate the grid power source from the fuel cell bus while the first variable frequency drive and the second variable frequency drive receive DC power from the fuel cell segment via the fuel cell bus, thereby operating the first support equipment and the second support equipment in a fuel cell segment stand alone mode.

5. The fuel cell system of claim 1, further comprising: an alternating current (AC) bus, wherein:
the grid power source is electrically connected to the first support equipment via the AC bus;
the grid power source is configured to provide AC power to the AC bus; and
the first variable frequency drive electrically connected to the AC bus and is further configured to receive direct current (DC) power from the fuel cell bus and AC power from the AC bus and generate the first variable frequency power output.

6. The fuel cell system of claim 5, wherein the second variable frequency drive is electrically connected the AC bus and configured to receive DC power from the fuel cell bus and AC power from the AC bus.

7. The fuel cell system of claim 6, further comprising: the rectifier electrically connected to the AC bus and configured to convert AC power from the AC bus to DC power; and
an information technology (IT) load electrically connected to the fuel cell bus and rectifier, wherein the IT load is configured to receive DC power from the fuel cell bus and the rectifier.

8. The fuel cell system of claim 6, wherein the controller is configured to control the operation of the first variable frequency drive and the second variable frequency drive to not draw DC power from the fuel cell bus while AC power is available from the AC bus, thereby operating the first support equipment and the second support equipment in an AC stand alone mode.

9. The fuel cell system of claim 1, further comprising: an alternating current (AC) bus, wherein:
the second variable frequency drive is electrically connected to the AC bus and configured to receive AC power from the AC bus,
the grid power source is electrically connected to the AC bus and configured to provide AC power to the AC bus;
the second support equipment is electrically connected to the second variable frequency drive and configured to receive the second variable frequency power output from the second variable frequency drive.

10. The fuel cell system of claim 9, further comprising: the rectifier electrically connected to the AC bus and configured to convert AC power from the AC bus to DC power; and
an information technology (IT) load electrically connected to the fuel cell bus and rectifier, wherein the IT load is configured to receive DC power from the fuel cell bus and the rectifier.

11. The fuel cell system of claim 9, further comprising: a third variable frequency drive electrically connected to the fuel cell bus and configured to receive DC power from the fuel cell bus and generate a third variable frequency power output; and
a third support equipment electrically connected to the third variable frequency drive and configured to receive the third variable frequency power output from the third variable frequency drive.

12. The fuel cell system of claim 11, wherein the second support equipment is configured to only meet start-up requirements for the fuel cell system, the fuel cell system wherein the controller is configured to control the operation of second variable frequency drive to stop providing the second variable frequency power output to the second support equipment when the fuel cell system exits a start-up state.

13. The fuel cell system of claim 12, wherein the first support equipment is a fuel exhaust recycle blower, the second support equipment is a catalytic partial pressure oxidation (CPOx) reactor air blower, and the third support equipment is an air inlet blower.

14. A method for operating a fuel cell system, comprising:
operating a fuel cell segment to provide power to first variable frequency drive via a fuel cell bus comprising a single polarity bus;
generating a first variable frequency power output at the first variable frequency drive;
providing the first variable frequency power output from the first variable frequency drive to a first support equipment;
operating the first support equipment using the first variable frequency power output to support operation of the fuel cell segment in providing power to the first variable frequency drive;
receiving direct current (DC) power from the fuel cell bus at a second variable frequency drive; and
generating a second variable frequency power output at the second variable frequency drive;
providing the second variable frequency power output to a second support equipment from the second variable frequency drive, wherein the first support equipment and the second support equipment are both blower, pump, or fan motors of a fuel support equipment, air support equipment, or ventilation support equipment;
operating the second support equipment using the second variable frequency power output;
providing power from an alternating current (AC) grid power source to at least one of the fuel cell bus, the first variable frequency drive, or the second variable frequency drive;
converting AC power from the grid power source to DC power provided to the fuel cell bus using a rectifier; and
operating one of the first variable frequency drive and the second variable frequency drive such that when one of the first support equipment or the second support equipment fails, the first variable frequency drive or the second variable frequency drive connected to the first support equipment or the second support equipment that did not fail controls the first support equipment or the second support equipment that did not fail.

15. The method of claim 14, wherein the first support equipment is a fuel recycle blower which recycles fuel exhaust from the fuel cell segment back into a fuel inlet stream provided into the fuel cell segment and the second support equipment is an air inlet blower which provides an air inlet stream into the fuel cell segment.

16. The method of claim 15, further comprising providing DC power from the fuel cell bus to an information technology (IT) load.

17. The method of claim 14, further comprising:
operating the rectifier to isolate the grid power source from the fuel cell bus while the first variable frequency drive and the second variable frequency drive receive DC power from the fuel cell segment via the fuel cell bus, thereby operating the first support equipment and the second support equipment in a fuel cell segment stand alone mode.

18. The method of claim 14, further comprising receiving AC power from an AC bus at the first variable frequency drive.

19. The method of claim 18, further comprising:
receiving the AC power from the AC bus and DC power from the fuel cell bus at the second variable frequency drive.

20. The method of claim 19, wherein the first support equipment is a fuel recycle blower which recycles fuel exhaust from the fuel cell segment back into a fuel inlet stream provided into the fuel cell segment and the second support equipment is an air inlet blower which provides an air inlet stream into the fuel cell segment.

21. The method of claim 20, further comprising:
converting AC power from the AC bus to DC power at the rectifier; and
providing DC power from the fuel cell bus and the rectifier to an information technology (IT) load.

22. The method of claim 21, further comprising:
operating the first variable frequency drive and the second variable frequency drive to not draw DC power from the fuel cell bus while AC power is available from the AC bus, thereby operating the first support equipment and the second support equipment in an AC stand alone mode.

23. The method of claim 14, further comprising:
receiving AC power from an AC bus at the second variable frequency drive;
converting AC power from the AC bus to DC power at the rectifier; and
providing DC power from the fuel cell bus and the rectifier to an information technology (IT) load.

24. The method of claim 23, further comprising:
receiving DC power from the fuel cell bus at a third variable frequency drive;
generating a third variable frequency power output at the third variable frequency drive;
providing the third variable frequency power output from the third variable frequency drive to a the third support equipment; and
operating the third support equipment using the third variable frequency power output.

25. The method of claim 24, wherein the first support equipment is a fuel exhaust recycle blower, the second support equipment is a catalytic partial pressure oxidation (CPOx) reactor air blower, and the third support equipment is an air inlet blower.

26. The method of claim 25, further comprising:
operating the CPOx reactor air blower when the fuel cell system is operated in a start-up mode; and
operating the fuel exhaust recycle blower and the air inlet blower and discontinuing operation of the CPOx reactor air blower when the fuel cell system exits the start-up mode.

27. The fuel cell system of claim 1, wherein fuel cell system is configured to provide main power to the first support equipment and to provide supplemental power to the first support equipment from the grid power source in a normal operating mode.

28. The method of claim 14, further comprising providing a main power from the fuel cell system and a supplemental power from the grid power source to the first support equipment in a normal operating mode.

* * * * *